May 1, 1934.  W. BARLOW  1,957,380
INDUCTION MOTOR
Filed Aug. 5, 1930   2 Sheets-Sheet 1

Fig. 1ª.

WITNESSES
Edw. Thorpe
A. L. Kitchin

INVENTOR
Wilfrid Barlow
BY
ATTORNEY

May 1, 1934.　　　　W. BARLOW　　　　1,957,380
INDUCTION MOTOR
Filed Aug. 5, 1930　　　2 Sheets-Sheet 2
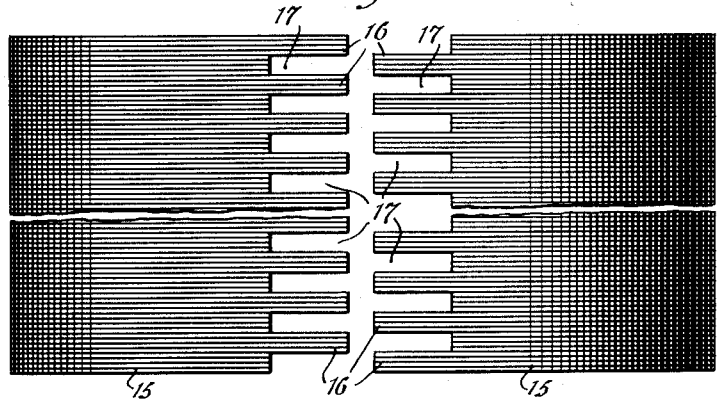
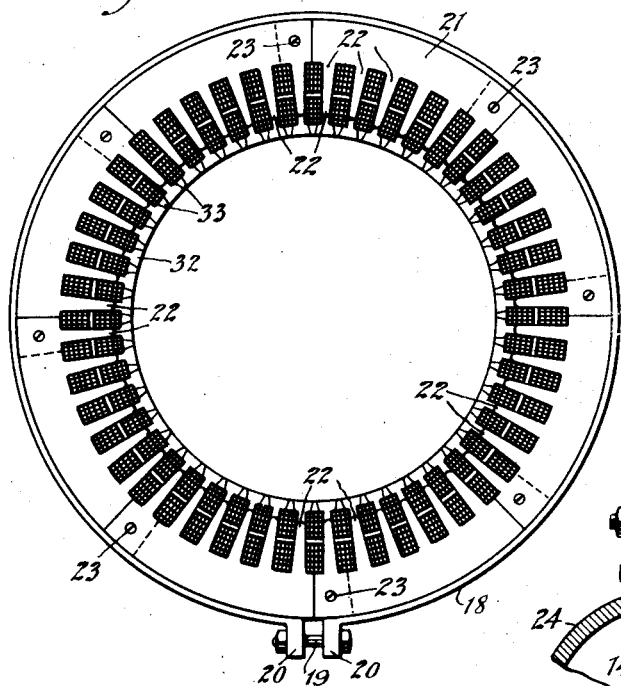
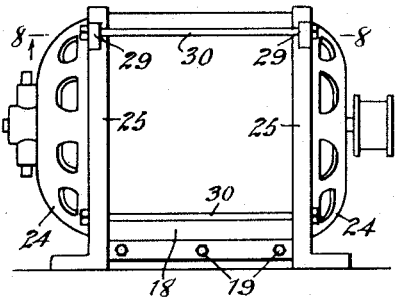
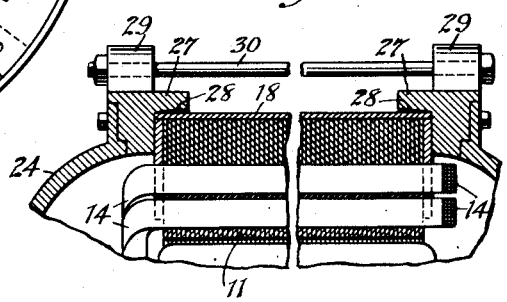
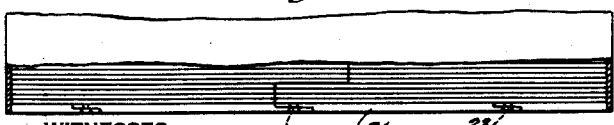
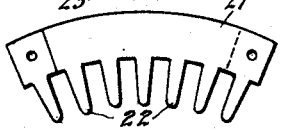
WITNESSES
Edw. Thorp
A. L. Kitchin
INVENTOR
Wilfrid Barlow
BY
ATTORNEY Patented May 1, 1934

1,957,380

UNITED STATES PATENT OFFICE 1,957,380

INDUCTION MOTOR

Wilfrid Barlow, Methuen, Mass.

Application August 5, 1930, Serial No. 473,188

11 Claims. (Cl. 172—280)

This invention relates to induction motors.

It is among the objects of the present invention to provide a novel and improved induction motor construction which provides for outwardly-opening winding slots in the stator.

A further object of the present invention is to provide a stator for induction motors, which has outwardly-opening slots adapted to receive the windings, together with improved means for closing the outer ends of the slots.

A further object of the present invention is to provide in an induction motor, an improved stator including outwardly-opening slots together with improved means for closing the outer ends of the slots.

A further object of the present invention is to provide in an induction motor, an improved stator including outwardly-opening slots together with improved means for closing the slots and for securing the same in closed position.

In connection with the present invention, it will be understood that the provision of outwardly-opening slots provides for ease in winding the stator and the improved construction further provides for the winding of the coils in closer layers and provides for perfect insulation, whereby higher voltages in smaller sizes of motors may be provided.

In connection with the present invention, it will be understood that the invention is applicable to various types of electrical equipment other than induction motors, and it will readily be seen that modifications of the invention may be readily provided which adapt the device for generators, windings or the like.

Other objects and features of the present invention will be apparent from a consideration of the following specification taken in conjunction with the accompanying drawings, in which Figure 1 is an end elevation of the stator ring of the present invention;

Fig. 4 is a top plan view of the laminated stator casing, showing the sections thereof in spaced relation;

Fig. 5 is an end elevation of the assembly with the stator casing in position and the end slot-closing plates;

Fig. 6 is a detail elevation showing the position of the closure plates;

Fig. 7 is an assembly of the motor;

Fig. 8 is a fragmentary sectional view, taken on lines 8—8 of Fig. 7;

Fig. 9 is a detail view of one of the closure plates.

Figure 1:
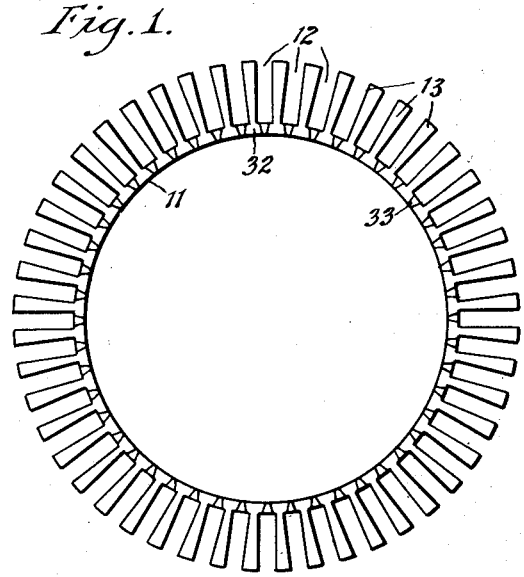
Fig. 1a is an enlarged fragmentary side view of part of the stator shown in Fig. 1.

Referring more particularly to the drawings, the invention is directed to an improvement in the stator of electrical machines, and includes the stator ring 10 having a smooth uninterrupted inner surface 11, which is adapted for electrical association with a rotor ring therein. The stator 10 further includes outwardly opening slots 12 formed by intermediate fingers 13. The slots 12 extend longitudinally of the stator and are adapted to receive the stator windings, which are indicated at 14 throughout the drawings. By this construction of stator ring, it will be seen that the windings may be laid in the slots 12 without the normally threading through as used in the closed slots, nor the crimping used in internally-opened inwardly-widening slots. The invention further provides a smooth metallic uninterrupted inner surface, whereby the efficiency in operating performance of the motor is improved by providing an uninterrupted metal path for the magnetic flux of the stator. It will also be seen that by the construction provided, better insulated and closer layers of wires may be inserted in the slots and the usual varnished finish may be more easily applied.

Figure 2:
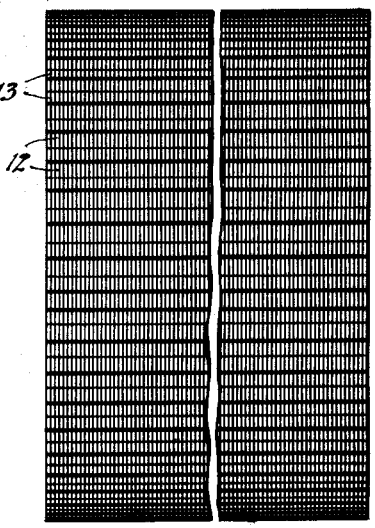
Fig. 2 is a side elevation of the stator.
Figure 3:
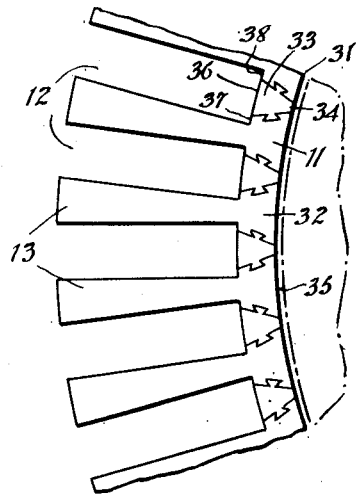
Fig. 3 is an end elevation of the stator showing the windings in position.
Figure 3:
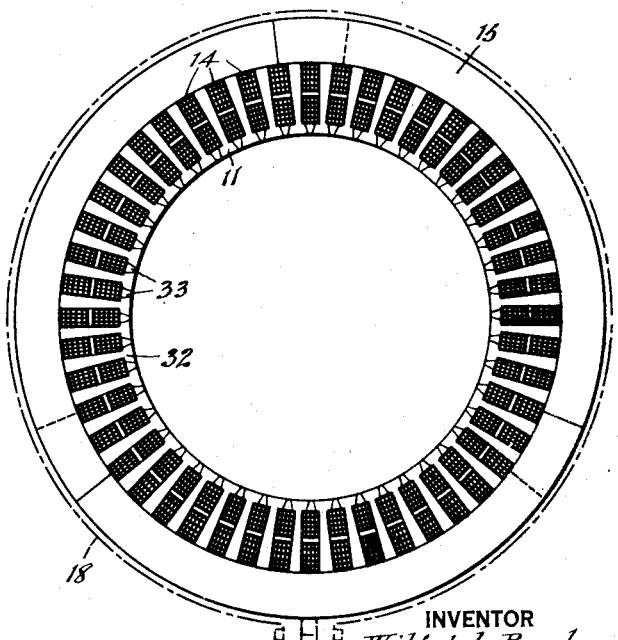

As shown in Fig. 2, the stator ring is preferably formed as a conventional laminated structure. Associated therewith there is provided a stator casing 15, as shown in Fig. 4. The casing also is of conventional laminated construction and to provide ease in assembly is formed in three sections, as indicated in Fig. 3, the ends of each section being provided with interlocking fingers 16, which are received within aligning slots 17 of the next adjacent section. The curvature of the casing 15 is such that its inner surface lies against the outer ends of the fingers 13 and secures the windings in proper position in the slots. For securing the casing upon the stator, a wide encircling band 18 is provided, which is adapted to be securely bolted around the casing to hold the casing sections together around the stator by a suitable bolt 19 passing through ears 20.

Associated with the ends of the stator and stator casing, there are provided flat plates 21 having inwardly-extending fingers 22, the arcuate plates being adapted to be bolted together as by screws 23, to form a continuous ring which lies against the casing, the fingers 22 being aligned with the fingers 13 of the stator 10 to insure proper alignment and retention of the coils within the slots and to lock the sections together to prevent movement of the coils from the slots. The rings also provide for maintaining the alignment of the windings with the slots and as will hereinafter be seen co-operate with the casing for maintaining the general assembly. Thus it will be seen that the whole construction provides a tightly closed assembly, one important feature of this construction being that it provides a material saving in the use of the conventional varnish, the varnish usually being applied to seep into various convolutions of the coils whereas in the present invention the amount of varnish is materially reduced.

By referring more particularly to Fig. 8, the general assembly includes end castings 24, associated with which are annular rings 25 bolted thereto. The rings have a vertical surface 26 adapted to lie against the plates 21, and further include upwardly and inwardly-tapering walls of the inwardly-extending flange 28. The rings 25 are further provided with apertured extending ears 29, which receive therethrough, tie bolts 30, the arrangement being such that upon tightening of the tie bolts, it will be seen that the vertical surfaces 26 of the rings bear against the plates 21, insuring the proper positioning of the casing and of the plates, while the sliding face of the flange 28 contacts with the band 18 to provide for rigid assembly thereof and for the proper positioning of the casing.

In Fig. 1a it will be noted that the stator 10, while presenting a smooth uninterrupted inner surface, is built up of a number of parts whereby a stator ring 31 is presented and a plurality of radially extending threaded fingers 13. The base 32 of the fingers 13 flare appreciably as shown in Fig. 1a and the respective bases of the respective fingers are connected together by suitable connectors 33 which are dovetailed into the bases in order to lock the bases together so as to form a substantially solid ring 31. The connecting wedge or block 33 may be made from metal fiber or other material but it must be of some non-magnetic material such for instance as bakelite, copper, brass, or some other non-magnetic metal may be used with the sides coated with porcelain or some other non-magnetic material which is also preferably an insulator. Preferably the connectors or wedges 13 have the lower or inner end 34 slightly wider than the space 35, while the upper end 36 reaches almost from one finger 13 to the next finger although falling somewhat short in order to present shoulders 37 and 38 on which the coils may rest. The magnetic flux flowing from the respective fingers 13 will naturally take a flared path and consequently the respective bases 32 will present a good conductor for this flux so that it will produce desirable results and will readily pass the gap or air space 35 as it is easier to pass this air space than to pass the end 34.

From the foregoing it will be seen that the present invention provides a novel and improved stator assembly for motors, generators, and the like, which may be readily wound, easily insulated and readily assembled to provide a more efficient stator. In connection with the present invention, it will be understood that the windings may be preformed and laid within the slots as in conventional rotor windings now in use. It will further be understood that the present invention discloses only one preferred embodiment of the invention, and that numerous changes, modifications, and the full use of equivalents may be resorted to without departing from the spirit or scope of the invention as outlined in the appended claims.

What is claimed is:

1. In an electrical motor, a stator including radially-extending fingers forming radially extending winding-receiving slots, said fingers being elongated and extending longitudinally of the stator to provide for the longitudinal extension of the slots and a removable constrictable casing mounted on the outer ends of said fingers.

2. In an electrical motor, a stator including radially-extending fingers forming radially-extending winding-receiving slots, said fingers being elongated and extending longitudinally of the stator to provide for the longitudinal extension of the slots, and a removable casing fitted over said stator to enclose the windings thereof between said stator and casing, said casing being formed of a plurality of sections having overlapping ends, and means for firmly clamping said sections against said fingers, said clamping means constricting said casing radially inwardly.

3. In an electrical motor, a stator including radially-extending fingers forming radially-extending winding-receiving slots, said fingers being elongated and extending longitudinally of the stator to provide for the longitudinal extension of the slots, and a removable casing fitted over said stator to enclose the windings thereof between said stator and casing said casing being formed in a plurality of parts, each part having fingers and slots associated with its ends to provide for the interlocking of said parts.

4. In an electrical motor, a stator including radially-extending fingers forming radially-extending winding-receiving slots, said fingers being elongated and extending longitudinally of the stator to provide for the longitudinal extension of the slots, a removable casing fitted over said stator to enclose the windings thereof between the stator and casing, said casing being formed in a plurality of parts, each part having fingers and slots associated with its end to provide for the interlocking of said parts, and plates associated between the ends of said stator and casing to insure proper electrical connection therewith and to provide proper alignment of the wires within said stator said plates having fingers alined with the first mentioned fingers.

5. In an electrical motor, a stator including radially-extending fingers forming radially-extending winding-receiving slots, said fingers being elongated and extending longitudinally of the stator to provide for the longitudinal extension of the slots, a removable casing fitted over said stator to enclose the windings thereof between the stator and casing, said casing being formed in a plurality of parts, each part having fingers and slots associated with its end to provide for the interlocking of said parts, plates associated between the ends of said stator and casing to insure proper electrical connection therewith and to provide proper alignment of the wires within said stator each of said plates having fingers alined with the first mentioned fingers, and a constricting encircling band for said casing to retain said casing about said stator said plates acting to constrict said casing so as to close its end inwardly and press tightly against the outer end of the first mentioned fingers.

6. In an electrical motor, a stator including radially-extending fingers forming radially extending winding-receiving slots, said fingers being elongated and extending longitudinally of the stator to provide for the longitudinal extension of the slots, a removable casing fitted over said stator to enclose the windings thereof between said stator and casing, said casing being formed in a plurality of parts, each part having fingers and slots associated with its end to provide for the interlocking of said parts, plates associated between the ends of said stator and casing to insure proper electrical connection therewith and to provide proper alignment of the wires within said stator each of said plates having fingers lined with the first-mentioned fingers, and an encircling band for said casing to retain said casing about said stator, said motor further including end plates joined by tie rods whereby tightening of said tie rods will cause contact of said end plates with the stator assembly to retain the same in proper position in said motor.

7. In an electrical motor, a stator ring including a plurality of radiating fingers, each of said fingers having a base forming part of said ring, and a connecting member of non-magnetic material connecting said bases to complete the ring.

8. In an electrical motor, a stator including a ring structure formed with a ring body and a plurality of radiating fingers, the ring body being formed from part of said fingers, and connecting magnetic insulating members.

9. In an electrical motor, a stator including a ring formation having fingers, the ring formation and the ring body consisting of the bases of said fingers and connecting members of non-magnetic material, said connecting members being dove-tailed into said bases.

10. In an electrical motor, a stator ring including a plurality of external radially-extending fingers forming externally-open radially-extending winding-receiving slots, means for mechanically connecting said fingers together and magnetically insulating said fingers from each other, and a removable casing for said stator ring.

11. A dynamo electric machine comprising a stator element, a divided outer magnetic circuit closing member to receive the stator element, a resilient split-ring frame member to receive the outer magnetic circuit closing member, and means for clamping the frame member upon the magnetic circuit closing member to place it under tension on the stator element.

WILFRID BARLOW.